No. 838,454. PATENTED DEC. 11, 1906.
L. T. RHEA.
STONE DRESSING MACHINE.
APPLICATION FILED SEPT. 15, 1905.
3 SHEETS—SHEET 2.
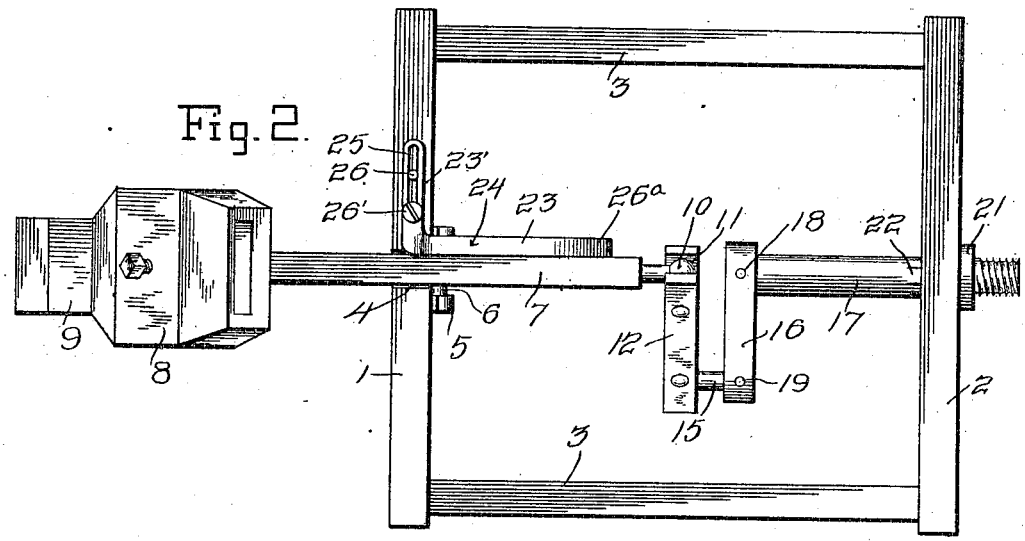
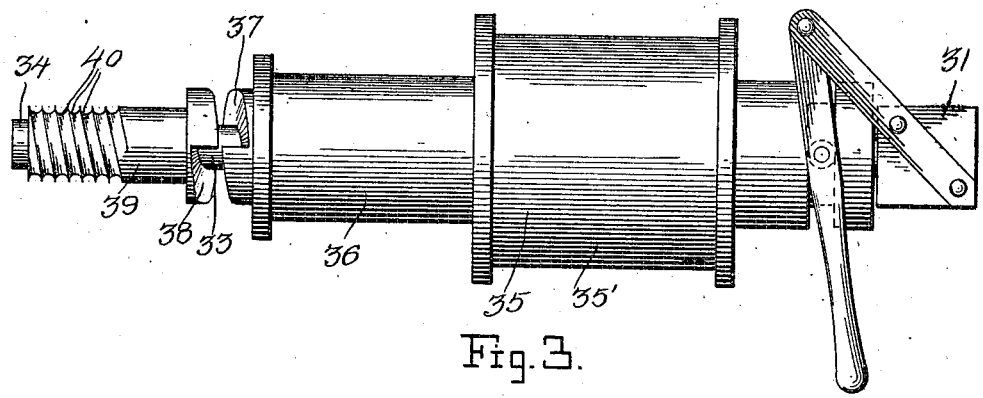
Witnesses
O. K. Reichenbach
F. C. Jones
Inventor
L. T. Rhea
By Chandlee & Chandlee
Attorneys No. 838,454. PATENTED DEC. 11, 1906.
L. T. RHEA.
STONE DRESSING MACHINE.
APPLICATION FILED SEPT. 15, 1905.
3 SHEETS—SHEET 3.
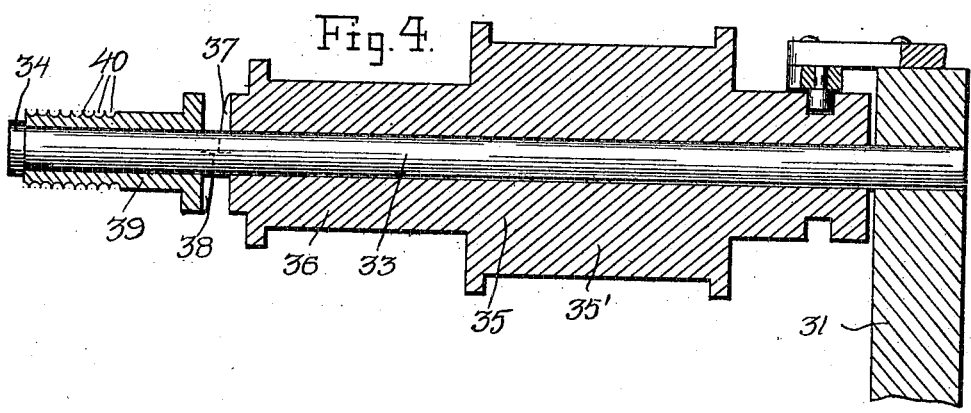
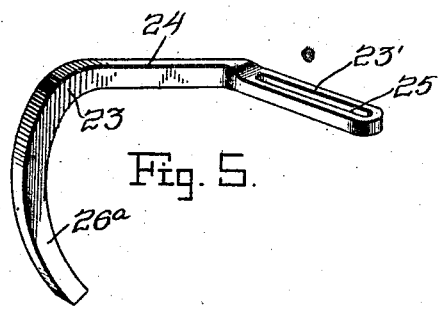
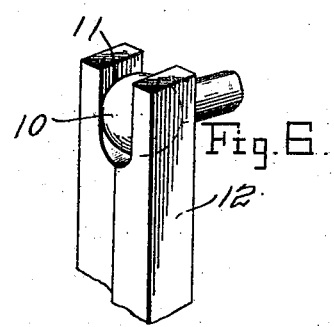

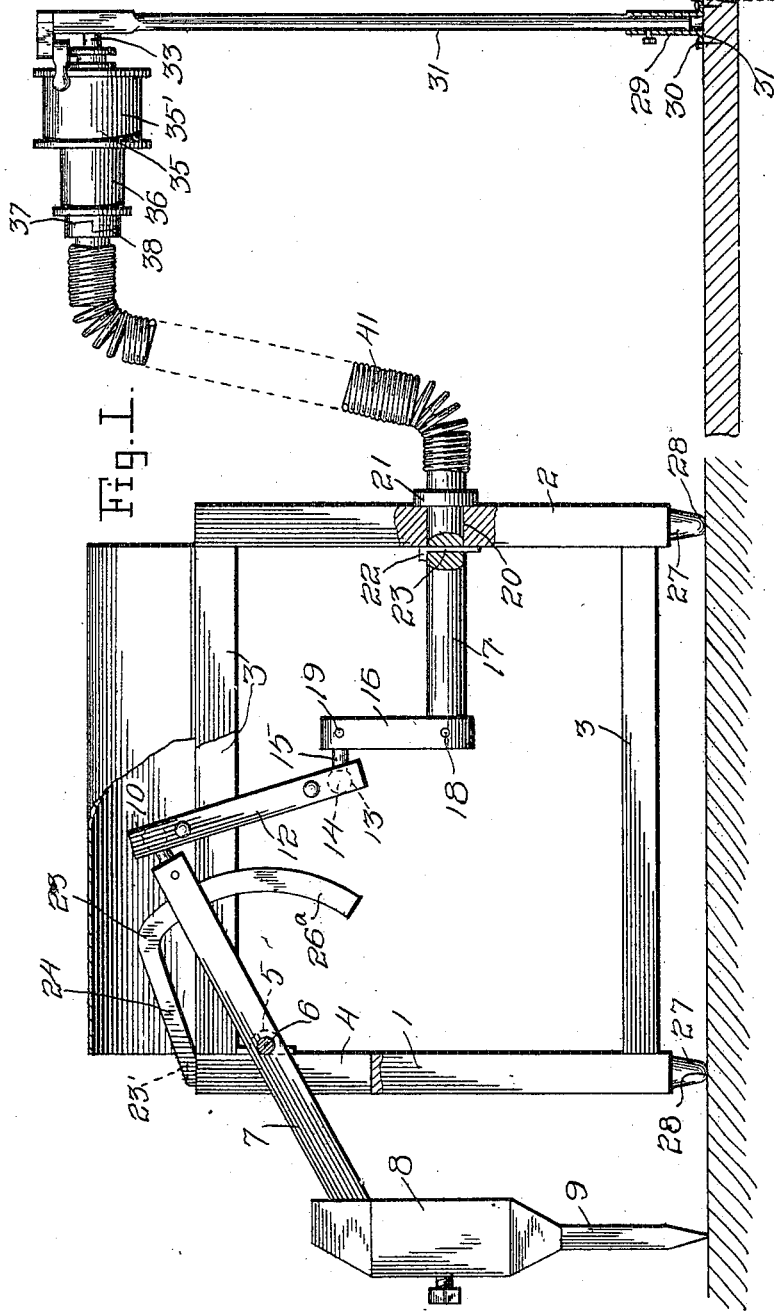

UNITED STATES PATENT OFFICE.

LEARNER T. RHEA, OF MOUNT PLEASANT, TEXAS.

STONE-DRESSING MACHINE.

No. 838,454.  Specification of Letters Patent.  Patented Dec. 11, 1906.

Application filed September 15, 1905. Serial No. 278,598.

*To all whom it may concern:*

Be it known that I, LEARNER T. RHEA, a citizen of the United States, residing at Mount Pleasant, in the county of Titus, State of Texas, have invented certain new and useful Improvements in Stone-Dressing Machines; and I do hereby declare the following to be a full, clear, and exact description of the invention, such as will enable others skilled in the art to which it appertains to make and use the same.

This invention relates to stone-dressing machines.

One object of the invention is to provide a machine embodying such characteristics that the dressing implement may be controlled at will through the instrumentality of a flexible connection between the dressing implement support or frame and the driving mechanism.

Another object of the invention resides in the provision of a comparatively simple, inexpensive, durable, and efficient machine for dressing stone.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is an elevation of my invention, partly in section. Fig. 2 is a top plan view of the frame with the cover thereof removed. Fig. 3 is a top plan view of the rotating drum including the upright at the top of which the drum is mounted and the lever for shifting the drum, the drum having its clutch-face out of engagement with the clutch-face of the tubular member. Fig. 4 is a sectional view through the drum and the support upon which it is mounted. Fig. 5 is a detail view of the guide. Fig. 6 is an enlarged detail view of the universal connection between the several arms of the frame.

Referring now more particularly to the accompanying drawings, it will be seen that the present invention comprises a frame consisting of side members 1 and 2, which are arranged in spaced relation and connected at their respective corners by means of suitable members 3. The side member 1 is provided with a slot 4 and upon its inner face with a pair of bearings 5, in which bearings the pivot-pin 6 of an arm 7 is mounted, whereby the said arm may have pivotal movement through the said slot 4. The end of the arm 7 projecting outwardly of the frame has secured thereto a tool-head 8, in which is mounted a detachable dressing-blade 9. The inner end of the arm 7 is provided with a ball 10 for engagement in the cup-shaped bifurcation 11 of another arm 12, whose opposite end is provided with a cup-shaped bifurcation 13 for engagement with the ball 14 of the stem 15, which is secured to one side face of a third arm 16 and near one end of the latter, the opposite end being secured to the horizontal rotating shaft 17 through the instrumentality of a suitable pin 18. The said stem 15 is secured in the arm 16 by means of a suitable pin 19, and reference to the drawings will disclose that the rotating shaft 17 is supported in a perforation 20 of the side member 2 and that inward movement of the said shaft 17 with respect to the said side 2 is prevented by reason of the formation of a shoulder 21 upon the said shaft and outward movement of the shaft with respect to the said side 20 prevented by reason of a key 22, passed through a perforation 23 in the shaft 17, which key impinges against the inner face of the said side member 2 to such an extent as to not interfere with proper rotation of the shaft 17, but efficiently serve to prevent outward movement of the shaft, as stated.

By reason of the foregoing ball-and-socket-joint connections between the various arms mentioned one arm is permitted to move in various directions with respect to another arm. In other words, the universal-joint connections are formed between the various arms, permitting them to move in different directions upon the rotation of the shaft 17 and reciprocate the arm 7 vertically, so that the edge of the dressing-blade 9 will have proper engagement with the stone for dressing it.

In order to provide for a steady vertical pivotal movement of the aforesaid arm 7, I provide a guide 23, which has its end 23' turned at a right angle to its body portion 24 and provided with a slot 25 for engagement over a stud 26, arranged upon the upper face of the side 1, in which slot 22 is also disposed a set-screw 26' for the purpose of adjusting the body portion 24 of the guide according to desires or conditions. Depending from the body portion 24 of said guide into the frame is the hooked bill portion 26ª of the said guide, which has its corresponding side face substantially in alinement with the corresponding side of the aforesaid slot 4 of the side 1. The extremity of this hooked bill 26ª of the guide does not contact with the inner face of the side 1, but extends in sufficient proximity thereto as to positively guide the aforesaid arm 7 in its vertical movement.

The frame hereinbefore described is of such proportions as to permit its ready handling for movement over the face of a stone; but as the same is made preferably of metal of the desired character and obviously under certain conditions rather heavy I provide legs 27, which are secured to the side members 1 and 2, with their extremities rounded, as at 28, so that the frame may be readily moved over the face of the stone.

In order to drive the shaft 17, I secure an upright tubing 29 to the floor of the room, shop, or upon the ground through the instrumentality of suitable fasteners 20, which pierce the flanged lower end 31 of the said tubing 29. Fitted in the upper end of this tubing is an upright 31, which is arranged adjustably in vertical plane within the said tubing 29 by means of a suitable set-screw 32, which pierces the upper end of the tubing 29 and engages the upright 31. The upper extremity of the upright 31 is provided with a perforation in which is secured in any suitable manner a horizontal beam 33, which is preferably circular in cross-section and provided with a head 34 at its outer extremity. Mounted for rotation upon this arm 31 is a drum 35, whose intermediate portion is larger than its ends, as indicated by the reference character 35', to form a pulley-wheel, the outer end of the drum 35 providing a pulley 36 of smaller dimensions than the pulley 35', with its free end so formed as to provide a clutch-face 37 for coöperation with a clutch-face 38, arranged at the inner end of a tubular member 39. This tubular member 39 is provided with screw-threads 40 for the reception of the coils at one end of the tubular flexible connection 40, whose opposite-end coils are fitted upon the screw-threaded outer end of the aforesaid shaft 17. Obviously, therefore, when the belts (not shown) of the said pulleys 35' and 36 cause rotation of the latter upon the beam 31 the clutch-faces 37 and 38 of the pulley 36 and tubular member 39, respectively, cause a rotation of the said flexible connection 40, which latter being connected with the aforesaid shaft 17 causes rotation of the same, and consequently a movement of the respective arms 7, 12, and 16 and also the stem 15, and causes a vertical reciprocation of the stone-dressing blade 9 in a manner now well understood.

In order to discontinue operation of the stone-dressing blade during rotation of the pulleys 35' and 36, I provide the inner end of the hollow drum 35 with an annular groove 41, in which engages the projection 42, depending from the under face of the lever 43, which is pivotally secured at its outer end in any suitable manner to a bracket 44, which latter is fixedly secured at its upper end to the upper face of the aforesaid upright 31, as clearly shown in the drawings. It will therefore be understood that the normal position of the drum 35 with respect to the tubular member 39 is such that the clutch-faces of each are designed to be in engagement with each other at all times, the said projection 42 of the lever 43 being in a groove 41 of the drum. Therefore movement of the arm 43 upon its pivot will draw the drum and the clutch-face 37 from engagement with the clutch-face 38 of the tubular member 39, thereby discontinuing rotation of the shaft 17 during further rotation of the pulleys 35' and 36.

While not altogether necessary, I provide a cover for the top of the aforesaid frame, which cover is secured in any suitable manner to the corresponding connecting-braces 3 and which bridges the same in an arched plane, as shown.

What is claimed is—

1. A machine of the class described comprising a rotatable shaft, a crank-arm carried by the shaft, a pivotally-mounted tool-carrying arm, a connection between said crank-arm and said tool-carrying arm, and a guide for said tool-carrying arm.

2. A machine of the class described comprising a rotatable shaft, a crank-arm carried by the shaft, a pivotally-mounted tool-carrying arm, a connection between said crank-arm and said tool-carrying arm, and a shiftable guide for said tool-carrying arm.

3. A machine of the class described comprising a rotatable shaft, a crank-arm carried by the shaft, a pivotally-mounted tool-carrying arm, a connection between said crank-arm and said tool-carrying arm, and an adjustable guide for said tool-carrying arm.

In testimony whereof I affix my signature in presence of two witnesses.

LON T. RHEA.

Witnesses:
W. A. KEITH,
GEO. F. JOHNSON.